United States Patent Office 3,012,852
Patented Dec. 12, 1961

3,012,852
STABILIZED CALCIUM PHOSPHATES AND PROCESS THEREFOR
George Douglas Nelson, St. Louis, Mo., assignor to Monsanto Chemical Company, St. Louis, Mo., a corporation of Delaware
No Drawing. Filed June 6, 1956, Ser. No. 589,595
14 Claims. (Cl. 23—109)

This invention relates to improved dentifrices, and dental polishing agents for use in toothpastes and tooth powders, and to a process for making the same. The dental polishing agents herein particularly contemplated are improved forms of dicalcium phosphate dihydrate, dimagnesium phosphate trihydrate, calcium pyrophosphate and magnesium pyrophosphate. The invention also relates to improved forms of the said compounds, per se.

Dicalcium phosphate dihydrate and calcium pyrophosphate have been used in dental preparations. These materials, however, have several faults which have combined to restrict their use in dentifrice preparations.

One of the difficulties encountered in the employment of unstabilized dicalcium phosphate dihydrate in dentifrice preparations is that, unless storage of this product is maintained at a relatively low temperature, there is a distinct tendency to lose water of crystallization. Another difficulty which has been encountered in the use of unstabilized dicalcium phosphate dihydrate, per se, is that there is a tendency for the product to "set up," or become lumpy, a condition which is highly undesirable in a toothpaste because of the difficulty of extruding the paste from the ordinary toothpaste tube. Various means have been proposed to increase the stability to heat and to overcome the lumping tendency, most of which means comprise the addition of varying amounts of a stabilizing agent to the dicalcium phosphate dihydrate after it is precipitated. It has now been found that dicalcium phosphate dihydrate and dimagnesium phosphate trihydrate may be prepared in forms of greater stability, free of the tendency to "set up" by a method which modifies the crystallization of the said hydrates. The present process thus avoids any after-addition or external addition of foreign substances to these compounds, subsequent to the crystallization thereof. For this reason the dicalcium phosphate dihydrate and dimagnesium phosphate trihydrate of the present invention are considered to be internally stabilized. According to the present invention, dicalcium phosphate dihydrate, for example, is prepared by first modifying phosphoric acid (of 10 wt. percent to 40 wt. percent $P_2O_5$ content) by the addition thereto of a minor amount of a material which furnishes pyrophosphate ions such as a pyrophosphate salt or pyrophosphoric acid. The amount employed is preferably sufficient to provide from 1% to 6% by weight of pyrophosphate ion in the phosphoric acid. The modifying compounds are preferably members of the class consisting of pyrophosphate salts which are soluble in phosphoric acid, and preferably at least 1% soluble therein, such as sodium, potassium, magnesium, calcium, aluminum, zinc, cadmium, tin, manganese and iron pyrophosphates and mixtures thereof. More preferred members of the class include sodium, potassium, magnesium and calcium pyrophosphates and mixtures thereof. Hydrates, such as magnesium pyrophosphate trihydrate may likewise be employed. When the hydrated forms are employed, suitable adjustment in the proportion is made by reason of the contained water of hydration. The temperature employed at the time of the addition of the said modifying pyrophosphates is not critical.

The modified phosphoric acid is employed in a reaction with a calcium source, such as calcium chloride, calcium oxide or calcium hydroxide in the form of a solution or slurry for the manufacture of the dicalcium phosphate dihydrate. For the precipitation of alkaline earth phosphate hydrates generally, a preferred group of precipitating agents are calcium oxide, calcium hydroxide, magnesium oxide and magnesium hydroxide. The temperature of the phosphoric acid during the precipitation in the presence of the lime slurry is preferably maintained within the range of 10° C. to 50° C. The reaction of the modified phosphoric acid and a lime slurry, for example, results in the precipitation of dicalcium phosphate dihydrate in the form of fine crystals. The mother liquor is then removed from the slurry of crystals by decantation. Filtration is employed to remove the remaining mother liquor, after which the precipitate is dried and milled to a fineness satisfactory for incorporation into dentifrice compositions. This product is also of utility as a leavening agent, such as in the baking of cakes.

The above method is also used in the preparation of dimagnesium phosphate trihydrate from modified phosphoric acid and magnesia slurry. In general the present invention contemplates the preparation of a compound selected from the class consisting of dicalcium phosphate dihydrate and dimagnesium phosphate trihydrate by the reaction of phosphoric acid, modified by the addition of pyrophosphate ions, such as from a pyrophosphate soluble in phosphoric acid; the said reaction taking place with a compound selected from the group consisting of an aqueous solution of a suitable soluble salt or a slurry of one of the oxides or hydroxides of the corresponding compounds, whereby the precipitate obtained is the desired orthophosphate hydrate in aqueous suspension.

The above-described process is found to increase the production rate of dicalcium phosphate dihydrate utilizing the same apparatus as has been conventional in prior art methods. The addition to the phosphoric acid of one of the pyrophosphates of the above-described group consisting of the sodium, magnesium and calcium pyrophosphates is found to render it possible to prepare a superior product without the necessity for utilizing some of the steps or treating methods which have heretofore been necessary in preparing this dihydrate.

The present invention also includes the manufacture of calcium pyrophosphate or magnesium pyrophosphate by thermally decomposing the above-described dicalcium phosphate dihydrate or magnesium phosphate dihydrate, respectively. This transformation is carried out by a heating step to accomplish a molecular dehydration of the said orthophosphate. The temperature employed in the formation of the pyrophosphate is preferably in the range of from 400° C. to 700° C. However, the actual reaction temperature and time required to convert the dicalcium phosphate dihydrate or the dimagnesium phosphate trihydrate to the corresponding calcium or magnesium pyrophosphate will depend also upon the particular type of process employed, e.g., whether the conversion is carried out in an oven, fluidized bed, rotary calciner, etc. Other variables, in addition to the temperature, are the nature and particle size of the raw material being converted and the time of passage through the conversion zone.

The calcium and magnesium pyrophosphates of the present invention are characterized by soft crystals which are very desirable for dentifrice formulations, and are greatly superior to the calcium pyrophosphate of the prior art, since the latter has always been a very gritty and abrasive material.

Although it is not possible to give a complete and rigorous definition of the interdependency of all of the possible process variables, both the general and the specific procedures to follow in practicing the present invention will be quite apparent from the foregoing discussion and the following examples. It should also be apparent how to modify particular process variables to obtain desired variations in product characteristics.

The present invention may be specifically described by the following examples:

EXAMPLE 1

To 21,500 g. of phosphoric acid (23.5 weight percent $P_2O_5$ content) contained in a reaction vessel, there was added 600 g. of calcium pyrophosphate, corresponding to 5% by weight of the product or 1.1% pyrophosphate ions in the phosphoric acid solution. The phosphoric acid mixture was then agitated while a lime slurry in water (12° Baumé; sp. gr., 1.1 g./ml. at 25–30° C.) was added. The addition was rapid at first and then continued with a gradually diminishing speed until the addition was very slow near the end point.

The end point was reached when 10 cc. of the mother liquid from the reaction mixture required between 1.8 and 2.5 cc. of N/10 normal NaOH to give the phenolphthalein end point. The temperature of the reaction mixture was maintained in the neighborhood of 45° C. during the reaction period. After the end point was reached, the mixture was agitated for one half hour, the precipitate allowed to settle, and the mother liquor decanted off. An amount of water approximately equal to that decanted was then added to the precipitate which was then agitated to wash the product free of any soluble impurities such as unreacted phosphates and pyrophosphates. The precipitate was then separated by filtration. The filter cake was dried overnight in air at room temperature and then ground to a suitable fineness for a dentifrice polishing agent (1% or less retained on a 325 mesh screen).

The above-described stabilized dicalcium phosphate dihydrate may also be transformed into a stabilized form of calcium pyrophosphate which is of utility in dentifrice formulations as a polishing agent.

EXAMPLE 2

The procedure of Example 1 was carried out with the variation that the modifying compound was a combination of magnesium oxide and sodium acid pyrophosphate added in quantities equal to 3% of $Mg_2P_2O_7$, referred to the weight of the total product, or equivalent to 1.2 weight percent of $P_2O_7$ ions referred to the phosphoric acid solution. The precipitation of dicalcium phosphate dihydrate was then conducted by the addition of lime to the modified phosphoric acid. The internally stabilized dicalcium phosphate dihydrate thus produced was found to maintain its water of crystallization unusually well despite prolonged heating. A weight loss test conducted for three hours at 100° C. utilizing a closed vessel to hold the sample showed a weight loss of 5.65% of water.

Another preparation with equivalent proportions was carried out using 3% $Mg_2P_2O_7$ as the sole modifying compound to obtain a similar dicalcium phosphate dihydrate product.

The preparation as above described yielded 12,000 g. of a crystalline dicalcium phosphate dihydrate dentifrice base of great stability upon storage and without the objectionable setting up tendency of the unstabilized form of dicalcium phosphate dihydrate. The dicalcium phosphate dihydrate as described may be employed as a leavening agent or may be incorporated into tooth paste compositions by the addition thereto of glycerine, sorbitol, gums, flavors, wetting agents, etc. Tooth powders may also be compounded using dry flavoring materials, soaps, wetting agents, etc.

EXAMPLE 3

A 12° Baumé lime slurry was added to 21,500 g. of phosphoric acid (23.5% $P_2O_5$) at 45° C. until the end point described in Example 1 was reached. The product was washed, dried and milled to a powder and a sample subjected to the 100° C. weight loss heat test. In contrast to Example 1, this control sample without stabilization showed a weight loss of 19.5% of water.

EXAMPLE 4

The method of Example 1 was utilized with the modification that the modifying compound was sodium acid pyrophosphate employed in the proportion of 3.5% relative to the weight of the final dicalcium phosphate dihydrate. This concentration corresponded to 1.3 weight percent pyrophosphate ion concentration in the phosphoric acid. The dicalcium phosphate dihydrate product obtained was subjected to a weight loss test in order to determine the degree of stabilization. It was found that the weight loss after three hours of heating at 100° C. in a closed vessel was 5.90% in contrast to the weight loss of 19.5% for an unstabilized sample (Example 3).

The method of Example 1 was also employed in a series of orthophosphate preparations in which equivalent concentrations of potassium acid pyrophosphate, magnesium pyrophosphate and calcium pyrophosphate, respectively, were utilized as the modifying compound in the preparation of dicalcium phosphate dihydrate. The internally stabilized hydrates were found to possess stability against the loss of the water of hydration when tested in accordance with the methods described below.

EXAMPLE 5

The method of Example 1 for the production of a stabilized product was carried out beginning with the modification of phosphoric acid (23.5 weight percent $P_2O_5$ content) by the addition of sodium acid pyrophosphate (3% by weight referred to the product, or 1.1% pyrophosphate ion referred to the phosphoric acid). Magnesia slurry was then added until the end point was reached as described in Example 1 to obtain dimagnesium phosphate trihydrate in a form having internal stability. The dimagnesium phosphate trihydrate was then subjected to calcination at 650° C. for two hours in order to form magnesium pyrophosphate. It was found that the abrasion index value of the magnesium pyrophosphate was 14, corresponding to a medium value abrasion material for dentifrice purposes.

EXAMPLE 6

The products described above were subjected to the following tests to determine their stability to heat (weight loss) and to setting up or lump formation (set test). Comparisons were made against samples with no stabilizing agent present, and with various amounts of other pyrophosphate stabilizing agents present. Comparisons were also made against products stabilized by the after-addition of sodium pyrophosphate to freshly precipitated dicalcium phosphate dihydrate.

To determine stability in the presence of heat, 10 g. of the milled product was sealed in a jar and placed in a laboratory oven maintained at 100°±2° C. for three hours, after which the jar lid was removed and the heating continued for 30 minutes to dry the material. The loss in weight of the product of Example 1 was 7.5%. In Table I are given the results of heat-stability tests made on dicalcium phosphate dihydrate prepared with internal stabilization, as described in Example 1 and also several comparison samples.

Table 1
HEAT STABILITY AND PHYSICAL PROPERTIES

| | Compound Precipitated | Stabilization Method | Preparation Method | Wt. Loss (Percent) After 3 Hrs. in Closed Vessel at 100° C. | Pass Set Test | Abrasion Index (After Heating 2 Hrs. at 650° C.) |
|---|---|---|---|---|---|---|
| 1 | $CaHPO_4 \cdot 2H_2O$ | Internal | $H_3PO_4$+5% Prod. wt. $Ca_2P_2O_7$+lime | 7.5 | Yes | 7. |
| 2 | $CaHPO_4 \cdot 2H_2O$ | ____do____ | As in Example 1, 3% $Mg_2P_2O_7$ | | Yes | 7. |
| 3 | $CaHPO_4 \cdot 2H_2O$ | None | As in Example 1, but without pyrophosphate. | 19.5 | No | 42. |
| 4 | $CaHPO_4 \cdot 2H_2O$ | Internal | As in Example 1, 3.5% $Na_2H_2P_2O_7$ | 5.9 | Yes | 7. |
| 5 | $MgHPO_4 \cdot 3H_2O$ | ____do____ | As in Example 1, 5% $Mg_2P_2O_7$; ppt. by magnesia slurry. | | | 14. |
| 6 | $CaHPO_4 \cdot 2H_2O$ | Stabilizing agent added after $CaHPO_4 \cdot 2H_2O$ prep. | $H_3PO_4$+lime with after addition of $Na_4P_2O_7$. | 8.82 | Yes | 16. |
| 7 | $CaHPO_4 \cdot 2H_2O$ | None | $H_3PO_4$+lime | 19.5 | No | 10-14 (tested without heating). |
| 8 | $CaHPO_4 \cdot 2H_2O$ | Internal | $H_3PO_4$+5% Prod. wt. $Ca_2P_2O_7$+lime | 7.5 | Yes | 7 (tested without heating). |

It may be noted from the test data for Example 3 that 66% of the original 26% of water of hydration present can be removed in three hours at 100° C. from the unstabilized dihydrate. With the after-addition stabilization procedure, about 42% is lost in the test (Example 6). Under the same test conditions, dicalcium phosphate dihydrate, internally stabilized with 3.5-5% sodium or calcium pyrophosphate loses only an average of 26% of the water of hydration (Examples 1 and 4).

Samples of unstabilized, and internally stabilized dicalcium phosphate dihydrate, as well as material stabilized by the after-addition method, were also subjected to the so-called "set test." A dental polishing agent is said to pass the "set test" if at the end of 30 minutes on a hot water bath a thin slurry of the polishing agent in 80% glycerine–20% water solution can be poured from the test tube which contains it. The results for the various preparation examples are given in Table I. Example 1 illustrates a typical composition of the present invention, which was satisfactory in both the set test and the heat-stability test.

An indirect measure of the stability of dicalcium phosphate dihydrate is the abrasion index of the calcium pyrophosphate produced therefrom. The abrasion index of the calcium pyrophosphate is a measure of the ease with which large, sharp-edged, hard crystals form. It has been found that the abrasion index is dependent upon conditions such as temperature, rate of dehydration, etc.

EXAMPLE 7

Under the same set of experimental conditions it has been found that stabilized dicalcium phosphate dihydrate of the present invention will produce a less abrasive and less gritty product than unstabilized dicalcium phosphate dihydrate. For example, 900 g. of the dicalcium phosphate dihydrate, stabilized as in Example 1 with 5% calcium pyrophosphate was heated in a laboratory furnace set at a temperature of 650° C. for two hours. The dicalcium phosphate dihydrate was converted completely to the pyrophosphate under these conditions. The product had an abrasion index of 7 when measured by the method described in U.S. Patent 2,697,024.

Abrasion index values for calcium pyrophosphate made from unstabilized dicalcium phosphate dihydrate, dicalcium phosphate dihydrate stabilized by after-addition, and from internally stabilized dicalcium phosphate dihydrate using various kinds and amounts of pyrophosphates are given in Table I. From the orthophosphates of Examples 1 and 4, calcium pyrophosphates were produced with abrasion indices less than 10, from internally stabilized dicalcium phosphate dihydrate. This may be compared to Example 3, in which no stabilization was used. In this case, an abrasion index value of 42 was obtained which is, of course, a strongly abrasive product.

It may also be pointed out from the calcium pyrophosphate preparation experiment that the internally stabilized dicalcium phosphate dihydrate gives a calcium pyrophosphate product which is less abrasive than that obtained with a dicalcium phosphate dihydrate stabilized after its manufacture. The latter type product is shown in Example 6 to produce a pyrophosphate product with an abrasion index of 16.

Both the orthophosphates and the pyrophosphates, described herein, may be employed in dentifrice compositions as polishing agents. The above-described calcium pyrophosphate and magnesium pyrophosphate, prepared from internally stabilized dicalcium phosphate dihydrate or dimagnesium phosphate trihydrate, respectively, are especially suitable as soft polishing agents, particularly in dentifrice compositions containing soluble fluorides. The pyrophosphates thus prepared from internally stabilized orthophosphate hydrates have relatively little reactivity with the fluorides which may be present in dentifrice compositions, in contrast to the pyrophosphates of the prior art. This is also an improvement over the use of conventional orthophosphates, such as dicalcium orthophosphate which is in wide use as a polishing agent in dentifrice cleansing compositions. The present calcium and magnesium pyrophosphates prepared from internally stabilized orthophosphate hydrates are relatively unreactive with fluorides, so that from the point of view of compatibility with soluble fluoride constituents, the use of the novel pyrophosphates represents an advance as a polishing agent in fluoride-containing dentifrice compositions.

The pyrophosphates of the present invention are utilized in dentifrice compositions in substantially the same manner and in substantially the same proportions as other polishing agents are used. For example, toothpastes formulated with these pyrophosphates will usually contain between about 30 weight percent and about 60 weight percent, and preferably between about 40 weight percent and about 50 weight percent of the pyrophosphate, between about 35 weight percent and about 54 weight percent, and preferably between about 45 weight percent and about 55 weight percent, of aqueous glycerine and/or sorbitol solutions (around 40–60% solutions), between about 0.25 weight percent and about 3 weight percent of a detergent, about 1 percent or so of a stabilizing or bodying agent, and small amounts (0.05–2%) of flavoring, coloring and preservative materials. The fluoride utilized in such a dentifrice will generally be a water-soluble salt such as $NaF$, $AlF_3$, $SnF_2$ or $NH_4F$, etc., and will be utilized in amounts which yield a fluoride ion concentration of 0.05 to 0.2% by weight.

Tooth powders generally contain between about 85 weight percent and about 99 weight percent of the polishing agent, with the remainder made up of small amounts of detergents, flavoring agents, etc., as mentioned above, as well as the aforementioned 0.05 to 0.2% weight percent of fluoride, calculated as fluoride ion.

The various detergents, stabilizing agents, flavoring agents, coloring agents, preservatives, etc., which can be incorporated into the foregoing formulations are well known to those skilled in the dentifrice art. The following formulation is an example of a typical toothpaste using the internally stabilized pyrophosphate of this invention.

| | Wt. percent |
|---|---|
| Calcium pyrophosphate produced by the decomposition of dicalcium phosphate dihydrate made from phosphoric acid containing a soluble pyrophosphate | 45.0 |
| Aqueous glycerine solution (50%) | 40.8 |
| Sodium lauryl sulfate | 2.0 |
| Essential oils | 0.5 |
| Gums (karaya and tragacanth) | 1.4 |
| Saccharin | 0.1 |
| Sodium fluoride | 0.2 |

A general formulation for a fluoride dentifrice as comprehended in the present invention is set forth below:

| | Percent |
|---|---|
| Pyrophosphate obtained by calcining an alkaline earth orthophosphate hydrate resulting from the modification of phosphoric acid by the addition thereto of a compound which supplies pyrophosphate ions, followed by the addition of an alkaline earth compound to precipitate the said alkaline earth orthophosphate hydrate | 1–97 |
| Soluble fluoride | 0.01–0.50 |
| Detergent (sodium lauryl sulfate) | 2–8 |
| Saccharin | 0.05–2 |
| Flavoring (essential oil) | 0.05–2 |

A general formula, utilizing the above-described alkaline earth phosphate hydrates, such as dicalcium phosphate dihydrate or dimagnesium phosphate trihydrate is set forth below:

| | Percent |
|---|---|
| An alkaline earth orthophosphate hydrate resulting from the modification of phosphoric acid by the addition thereto of a compound which supplies pyrophosphate ions, followed by the addition of an alkaline earth compound to precipitate the said alkaline earth orthophosphate hydrate | 1–97 |
| Detergent (sodium lauryl sulfate) | 2–8 |
| Saccharin | 0.05–2 |
| Flavoring (essential oil) | 0.05–2 |

The detergents employed in general are of the sodium alkyl sulfate type. When it is desired to provide a fluoride type of dentifrice, the above formulation may be supplemented by the addition of a soluble fluoride, such as tin fluoride or sodium fluoride in the weight range of 0.05–2%.

The above formulations may be utilized as a tooth powder or may be further modified to prepare a toothpaste. For example, 450 parts by weight of the above powder may be mixed with 550 parts of an elixir prepared utilizing the formulation below:

| | Example, grams | Range, percent |
|---|---|---|
| 1. Glycerine | 255 | 29–59 |
| 2. Water | 281 | 59–38 |
| 3. Bodying agents (50 & gum Karaya and 50 & gum Tragacanth) | 14 | 0.5–4 |

The above formulations were found to yield satisfactory dentifrices which possess a long shelf life without setting up in the tube. In general, the proportion of the powder components is from 30% to 60% by weight in order to obtain a smooth paste.

If a fluoride dentifrice is desired, a soluble fluoride salt, for example, aluminum fluoride, is used at about 0.1% calculated as fluoride (e.g., 0.939% in the above formulation). In general, the weight percentage of the fluoride as a salt is preferred to be in the range of 0.05% to 0.2%.

The abrasion index, also designated as the "polishing power" or "hardness" of the novel form of calcium or magnesium pyrophosphate of the present invention, may be expressed in terms of a convenient, numerical scale determined and defined in accordance with the disclosure in the Moss et al. Patent U.S. 2,697,024. The calcium pyrophosphate which was available prior to the present invention generally had a polishing power of between about 30 and about 40, although a few isolated instances may be obtained having a polishing power as low as about 25. In contrast thereto, the calcium or magnesium pyrophosphates prepared from internally stabilized orthophosphate dihydrates, as described herein can have a polishing power as low as about 5 to 6, generally running between about 6 and 25. The preferred range of abrasion index for use in dentifrice compositions is between about 5 and about 18.

I claim:

1. A method which comprises adding to orthophosphoric acid a minor amount of a compound selected from the group consisting of pyrophosphoric acid and pyrophosphate salts which are soluble in orthophosphoric acid and which ionize in orthophosphoric acid to produce pyrophosphate ions, and thereafter reacting the foregoing mixture with an alkaline earth compound selected from the group consisting of calcium and magnesium oxides and hydroxides to precipitate the corresponding dibasic alkaline earth orthophosphate hydrate.

2. The method of claim 1 in which the pyrophosphate compound is a sodium pyrophosphate.

3. The method of claim 1 in which the pyrophosphate compound is a calcium pyrophosphate.

4. The method of claim 1 in which the pyrophosphate compound is a magnesium pyrophosphate.

5. The method of preparing an improved stabilized dicalcium orthophosphate dihydrate which comprises adding to orthophosphoric acid a sufficient amount of a compound selected from the group consisting of pyrophosphoric acid and pyrophosphate salts which are soluble in orthophosphoric acid to provide a pyrophosphate ion concentration between about 1 percent and about 6 percent by weight in said orthophosphoric acid, and thereafter reacting the foregoing mixture with lime to precipitate the desired dicalcium phosphate dihydrate.

6. The method of claim 5 in which the pyrophosphate compound is a sodium pyrophosphate.

7. The method of claim 5 in which the pyrophosphate compound is a calcium pyrophosphate.

8. The method of claim 5 in which the pyrophosphate compound is a magnesium pyrophosphate.

9. The method of preparing an improved stabilized dimagnesium phosphate trihydrate which comprises adding to orthophosphoric acid a sufficient amount of a compound selected from the group consisting of pyrophosphoric acid and pyrophosphate salts soluble in orthophosphoric acid to provide a pyrophosphate ion concentration between about 1 percent and about 6 percent by weight in said orthophosphoric acid, and thereafter reacting the foregoing mixture with magnesia to precipitate the desired dimagnesium orthophosphate trihydrate.

10. The method of claim 9 in which the pyrophosphate compound is a sodium pyrophosphate.

11. The method of claim 9 in which the pyrophosphate compound is a calcium pyrophosphate.

12. The method of claim 9 in which the pyrophosphate compound is a magnesium pyrophosphate.

13. A stabilized precipitated compound selected from the group consisting of dibasic calcium orthophosphate dihydrate and dibasic magnesium orthophosphate trihydrate prepared by adding to orthophosphoric acid a minor amount of a compound selected from the group consisting of pyrophosphoric acid and pyrophosphate salts which are soluble in orthophosphoric acid and which ionize in orthophosphoric acid to produce pyrophosphate ions, and thereafter reacting the foregoing mixture with an alkaline earth compound selected from the group consisting of calcium and magnesium oxides and hydroxides to precipitate the corresponding dibasic alkaline earth orthophosphate hydrate.

14. A material desirable for use as an abrasive in dentifrice formulations and characterized by soft crystals, said material being selected from the group consisting of calcium and magnesium pyrophosphates prepared by calcining a stabilized precipitated compound selected from the group consisting of dibasic calcium orthophosphate dihydrate and dibasic magnesium orthophosphate trihydrate prepared by adding to orthophosphoric acid a minor amount of a compound selected from the group consisting of pyrophosphoric acid and pyrophosphate salts which are soluble in orthophosphoric acid and which ionize in orthophosphoric acid to produce pyrophosphate ions, and thereafter reacting the foregoing mixture with an alkaline earth compound selected from the group consisting of calcium and magnesium oxides and hydroxides to precipitate the corresponding dibasic alkaline earth orthophosphate hydrate.

References Cited in the file of this patent

UNITED STATES PATENTS

| | | |
|---|---|---|
| 1,925,644 | Pristoupil | Sept. 5, 1933 |
| 2,018,410 | McDonald et al. | Oct. 22, 1935 |
| 2,019,142 | Kuever | Oct. 29, 1935 |
| 2,142,943 | Kerschbaum | Jan. 3, 1939 |
| 2,287,699 | Moss et al. | June 23, 1942 |
| 2,288,418 | Partridge | June 30, 1942 |
| 2,511,249 | Durgin et al. | June 13, 1950 |

FOREIGN PATENTS

| | | |
|---|---|---|
| 441,474 | Great Britain | Jan. 20, 1936 |
| 505,321 | Great Britain | May 9, 1939 |